(No Model.) 2 Sheets—Sheet 2.
W. FRUHLING, Sr.
GRAPE AND ORCHARD CULTIVATOR.
No. 292,297. Patented Jan. 22, 1884.
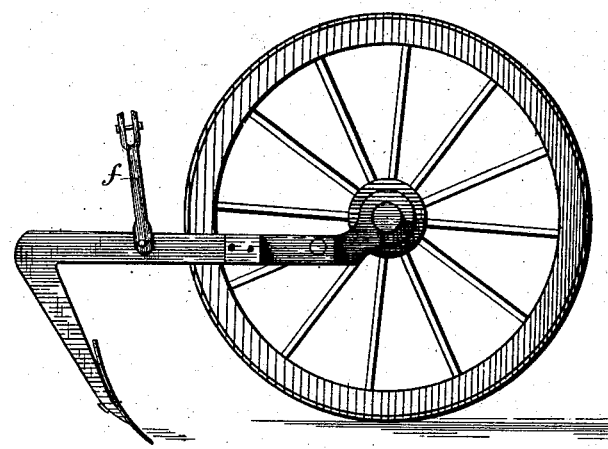
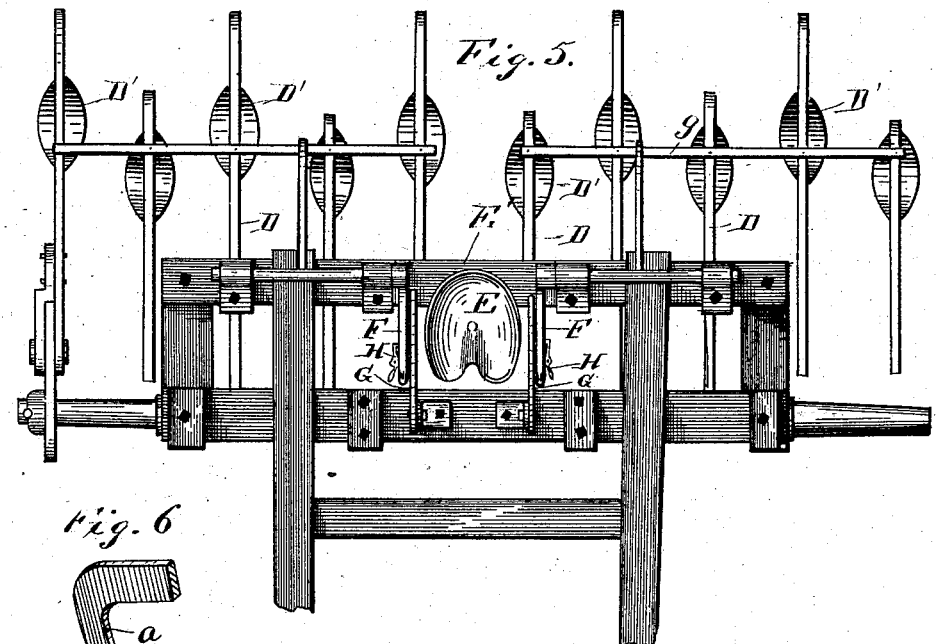
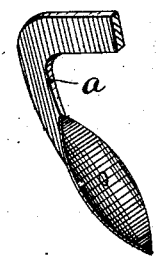
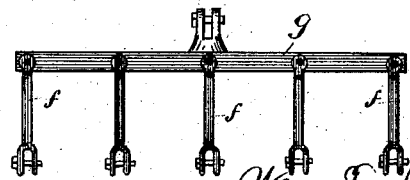
WITNESSES
W. E. Bowen
Chas. R. Burr
INVENTOR
Wm Fruhling Sr.
By Myers & Co.
Attorneys.

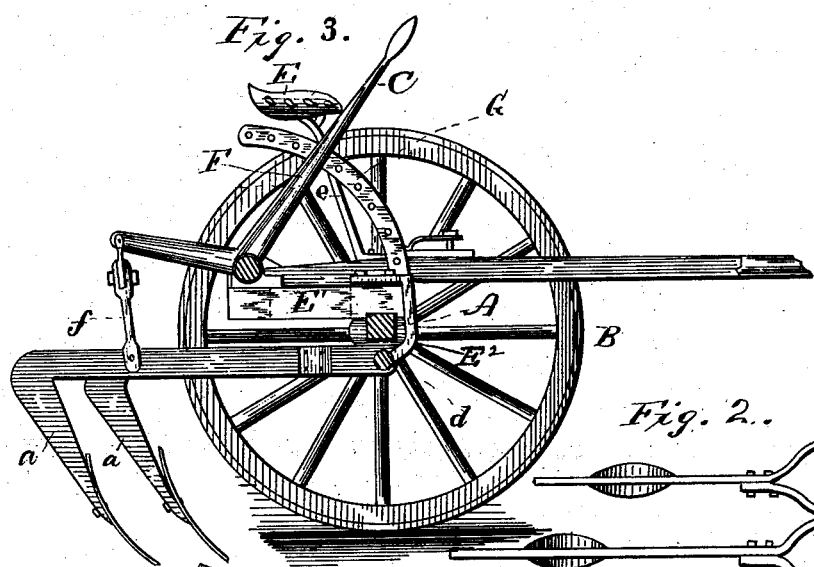
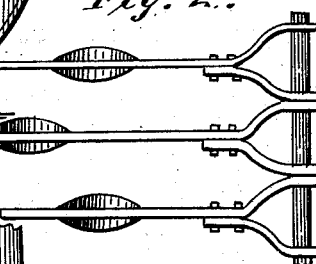
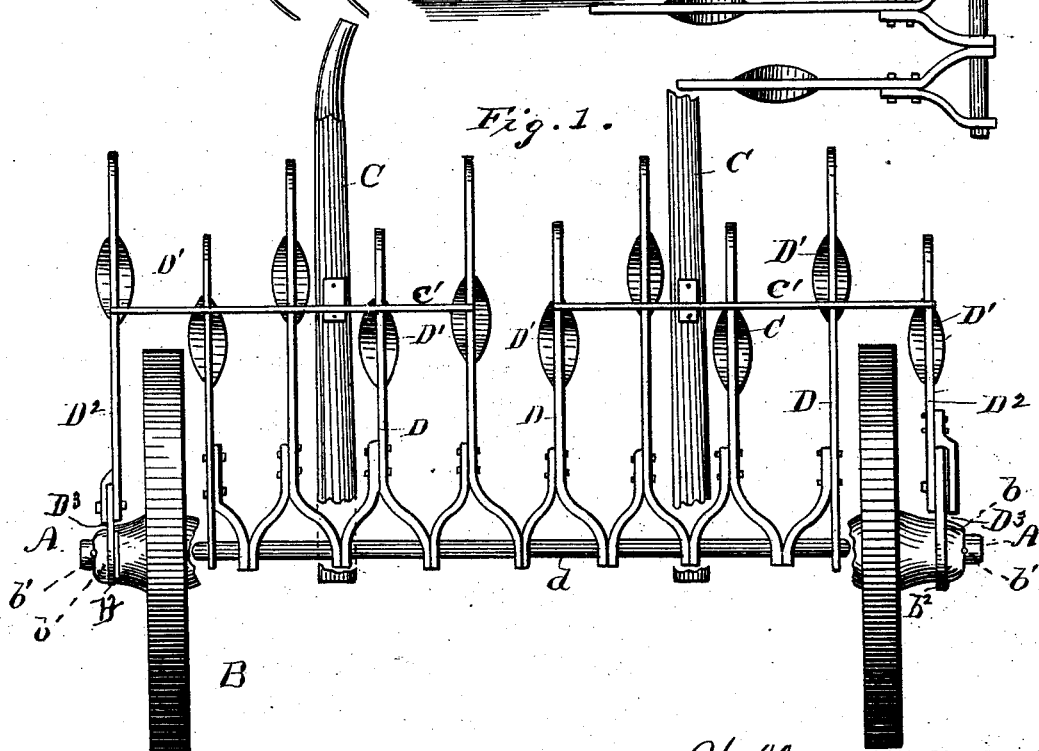

UNITED STATES PATENT OFFICE.

WILLIAM FRUHLING, SR., OF SAN JOSÉ, CALIFORNIA.

GRAPE AND ORCHARD CULTIVATOR.

SPECIFICATION forming part of Letters Patent No. 292,297, dated January 22, 1884.

Application filed September 22, 1883. (No model.)

*To all whom it may concern:*

Be it known that I, WILLIAM FRUHLING, Sr., a citizen of the United States of America, residing at San José, in the county of Santa Clara and State of California, have invented certain new and useful Improvements in Grape and Orchard Cultivators, of which the following is a specification, reference being had therein to the accompanying drawings.

This invention pertains to improvements in cultivators, having for its object to effect the thorough and proper cultivation of the plants, and to permit the machine to be drawn closely to the vines or trees during such operation, to enable the working of all the plants; and the invention consists of the combination and construction of parts, substantially as hereinafter fully set forth and claimed.

In the accompanying drawings, Figure 1 is a plan view, with the seat-supporting frame and seat removed and parts broken away. Fig. 2 is also a detail plan view. Fig. 3 is a sectional elevation. Fig. 4 is a detail elevation, showing outside plow-beams. Fig. 5 is a plan view of my invention. Figs. 6 and 7 are detail views thereof.

In carrying out my invention in one form I employ an axle, A, mounted in wheels B, said axle having connected to it, as shown in Fig. 1, handles C, whereby the machine may be used with the attendant walking. From this axle are hung, in two series, beams D D, provided with cultivator shovels or teeth D', said beams being curved downward and inward at their rear ends, as at $a$, where the shovels or teeth are affixed. Of these beams two, $D^2$, are connected to the ends of the axle outside of the wheels, as shown more particularly in Fig. 1, said beams being slipped against the hubs of the wheels and held in place by washers $b$ and pins $b'$, inserted through the axle against the washers. The beams $D^2$ are each articulated to the projecting bar $D^3$ of the hub-sleeve $b^2$, to enable the outside shovels or teeth, D', secured thereto, to adjust themselves to any inequality of the land-surface outside of the path of the main or central shovels, D'. The teeth or shovels are arranged alternately inward and outward, the beams being alternately short and long, to permit the independent action of each shovel. Each of the two series of beams is connected together by a cross-bar, $c'$, beneath which are arranged and to which are secured the handles C, to enable the adjusting into and out of the ground of the teeth or shovels, and the independent use of the two series of beams, whereby one series may be operated while the other is out of use, or both may be operated simultaneously. A rod or cylindrical bar, $d$, is passed through the inner ends of the beams near the axle, the beams being connected by brackets $E^2$ to the axle.

To enable the adjustment of each of the series of beams by the driver occupying the seat E, (see Figs. 3 and 4,) secured upon a bar, $e$, fastened to the frame E', I employ a long-handled elbow-lever, F, pivoted at its angle to the rear upper side of the frame, said lever being connected by links $f$, pivoted to the rear ends thereof and to the individual beams, as seen in Figs. 3 and 4, or to connecting rods or bars $g$, one applied to each series of the beams, as shown in Figs. 5 and 7. Serially apertured or perforated segmental bars G, suitably secured to the frame E', are provided, together with spring hand-operated pawls H, applied to the hand-levers F, so as to enter coincident apertures of the bars G, to effect the holding of the said levers at their points of adjustment in raising and lowering the cultivator-beams.

It will be observed that with this machine the cultivation of the plants can be effected even where they are growing closely to vines or trees, and where otherwise the cultivation of the same with a hand implement would be required.

Having thus described my invention, I claim and desire to secure by Letters Patent—

1. In a grape and orchard cultivator, the beams D, brackets $E^2$, cross-bar C', and rod or cylindrical bar $d$, in combination with the shovel-beams $D^2$, jointed to hub-sleeves $b^2$, and frame E', substantially as shown, and for the purpose described.

2. The combination of the shovel-beams $D^2$, jointed to the hub-sleeves $b^2$, with the shovel-beams D, secured to frame E' by brackets $E^2$, connecting-bars C', and rod $d$, substantially as shown, and for the purpose described.

In testimony whereof I affix my signature in presence of two witnesses.

WILLIAM FRUHLING, SR.

Witnesses:
JAMES B. CAPP,
CHAS. C. REDMOND.